(12) United States Patent
Pepin et al.

(10) Patent No.: US 10,921,204 B2
(45) Date of Patent: Feb. 16, 2021

(54) COMPACT SENSOR CONNECTOR FOR SINGLE-USE FLUID MEASUREMENT

(71) Applicant: Rosemount Inc., Shakopee, MN (US)

(72) Inventors: Nathan R. Pepin, Wenatchee, WA (US); Michael A. Knopf, East Wenatchee, WA (US); James Walters, III, Malaga, WA (US); David A. Andrew, Wenatchee, WA (US); Cameron S. Wallace, Peshastin, WA (US)

(73) Assignee: Rosemount Inc., Shakopee, MN (US)

( * ) Notice: Subject to any disclaimer, the term of this patent is extended or adjusted under 35 U.S.C. 154(b) by 182 days.

(21) Appl. No.: 16/130,288

(22) Filed: Sep. 13, 2018

(65) Prior Publication Data

US 2019/0078952 A1    Mar. 14, 2019

Related U.S. Application Data

(60) Provisional application No. 62/558,601, filed on Sep. 14, 2017.

(51) Int. Cl.
*G01L 9/00* (2006.01)
*G01F 1/38* (2006.01)
*G01L 19/00* (2006.01)
*H01R 13/52* (2006.01)

(52) U.S. Cl.
CPC ............ *G01L 9/0042* (2013.01); *G01F 1/383* (2013.01); *G01L 9/0041* (2013.01); *G01L 19/0007* (2013.01); *G01L 19/0069* (2013.01); *G01L 19/0038* (2013.01); *H01R 13/5202* (2013.01)

(58) Field of Classification Search
None
See application file for complete search history.

(56) References Cited

U.S. PATENT DOCUMENTS

| | | | |
|---|---|---|---|
| 8,640,560 | B2 | 2/2014 | Burke |
| 2004/0027912 | A1 | 2/2004 | Bibbo et al. |
| 2012/0240686 | A1 | 9/2012 | Blomberg et al. |
| 2017/0003183 | A1 | 1/2017 | Fadell et al. |

FOREIGN PATENT DOCUMENTS

JP        2004037388 A        2/2004

OTHER PUBLICATIONS

International Search Report and Written Opinion for International Patent Application No. PCT/US2018/050861, dated May 26, 2020, 11 pages.

*Primary Examiner* — Lisa M Caputo
*Assistant Examiner* — Nigel H Plumb
(74) *Attorney, Agent, or Firm* — Christopher R. Christenson; Kelly, Holt & Christenson, PLLC

(57) ABSTRACT

A connector for coupling a single-use container to a measurement instrument includes a connector region having a cylindrical sidewall. The connector includes a deflectable diaphragm sealed to the connector region and configured to contact a media sample. A portion of the deflectable diaphragm lines an interior surface of at least a portion of the substantially cylindrical sidewall.

19 Claims, 8 Drawing Sheets

COMPACT SENSOR CONNECTOR FOR SINGLE-USE FLUID MEASUREMENT

CROSS-REFERENCE TO RELATED APPLICATION

The present application is based on and claims the benefit of U.S. provisional patent application Ser. No. 62/558,601, filed Sep. 14, 2017, the content of which is hereby incorporated by reference in its entirety.

BACKGROUND

Single-use containers, such as bioreactors, are useful for generating and supporting biological reactions for any number of purposes. Biological reactions can be susceptible to small changes in pressure and/or temperature. Moreover, the procedure to conduct the bioreaction or even the reaction itself may change various parameters within the bioreactor, such as the pressure. Accordingly, it may be important to monitor pressure or other variables of the biological reaction.

The life sciences industry is moving from large, capital-intensive facilities made of stainless steel with large clean-in-place (CIP) infrastructure to smaller facilities that use polymeric bags or containers functioning as bioreactors. The bioreactor bag is used once and then discarded. This single-use bioreactor technique significantly reduces the capital cost of the plant. For example, in existing facilities that use stainless steel CIP infrastructure, up to 90% of the cost of operating the facility may be due to the clean-in-place infrastructure, including very high end instrumentation designed to withstand a steam cleaning cycle. By moving to disposable, single-use bioreactor bags, the CIP portion of the capital can be eliminated, and the facility can be more flexible and much smaller, which, in turn, allows the production of the smaller batches that are needed for more targeted drug therapies and other smaller-scale applications.

As pharmaceutical manufacturers change over from large stainless-steel process vessels to smaller-volume, pre-sterilized, disposable plastic bag systems, there is a need to measure pressure and/or other variables in these systems to control the growth environment and subsequent processes. Typically, pharmaceutical manufacturers and the life science industry in general, have used inexpensive and low accuracy pressure sensors that are pre-sterilized and are disposed of after a single-use. Such inexpensive sensors use relatively crude methods for fluid isolation. These methods can lead to inaccurate measurements, which are generally unacceptable to the life sciences industry for supporting the various biological reactions.

SUMMARY

A connector for coupling a single-use container to a measurement instrument includes a connector region. The connector includes a deflectable diaphragm sealed to the connector region and configured to contact a media sample.

DETAILED DESCRIPTION OF ILLUSTRATIVE EMBODIMENTS

During a biological reaction within a single-use container, it is often important to monitor various parameters of the reaction such as pressure, temperature, dissolved oxygen, pH, among a variety of other parameters.

In accordance with an embodiment of the present invention, a connector is provided that maintains an interface between a measuring instrument and a media sample from a single-use container. In one example, the sensor connector allows the measuring instrument to monitor a parameter of the media sample, via a diaphragm of the sensor connector, while maintaining the media integrity within the single-use container. However, it is contemplated that the sensor connector maintains the media integrity with or without the measuring instrument attached to the sensor connector. Additionally, the sensor connector protects the measuring instrument from adverse effects stemming from direct contact with the media (such as contamination or corrosion).

It is contemplated that embodiments of the present invention may allow single-use bags, tubing or other containers to be permanently sealed and sterilized and to maintain this state throughout a reaction while a measuring instrument monitors at least one parameter of the reaction. Additionally, high quality reusable instrumentation (such as a process variable pressure transmitter) can be employed at or coupled to the sensor interface of the diaphragm without first requiring the reusable instrumentation to be sterilized. While the description provided below will mention biological reactions and bioreactors, it is contemplated that embodiments can also be used any time a low-cost sensor connector is required between a low-cost containment system and a precision measurement instrument.

Figure 1A:
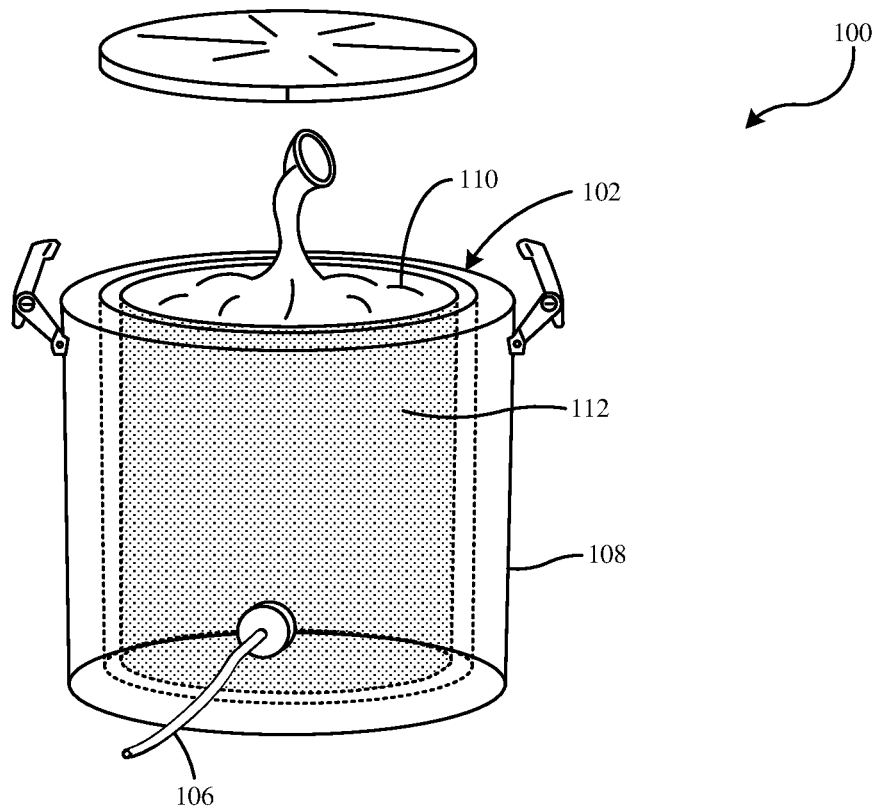
FIG. 1A is a diagrammatic view of a single-use container, such as a bioreactor, with which embodiments of the present invention are particularly applicable.

FIG. 1A is a diagrammatic view of a single-use container, such as a bioreactor, in accordance with an embodiment of the present invention. Bioreaction system 100 includes a bioreactor 102, configured to carry out a biological reaction, coupled to a measuring instrument (shown in FIG. 1B) via tubing 106.

Bioreactor 102 illustratively includes an outer support container 108 with a wall that is relatively solid such that it forms a shell for a single-use bioreaction bag 110 disposed therein. Support container 108 is generally matched to the dimensions and functionality of single-use bioreaction bag 110 to support biological sample 112, which undergoes a reaction within bioreaction bag 110. In operation, support container 108 is typically a reusable item, while single-use bioreaction bag 110 is generally a polymeric bag that is disposed of after a biological reaction occurs within sample 112. There are some instances where the bioreaction bag 110 is meant to be used without support container 108.

Figure 1B:
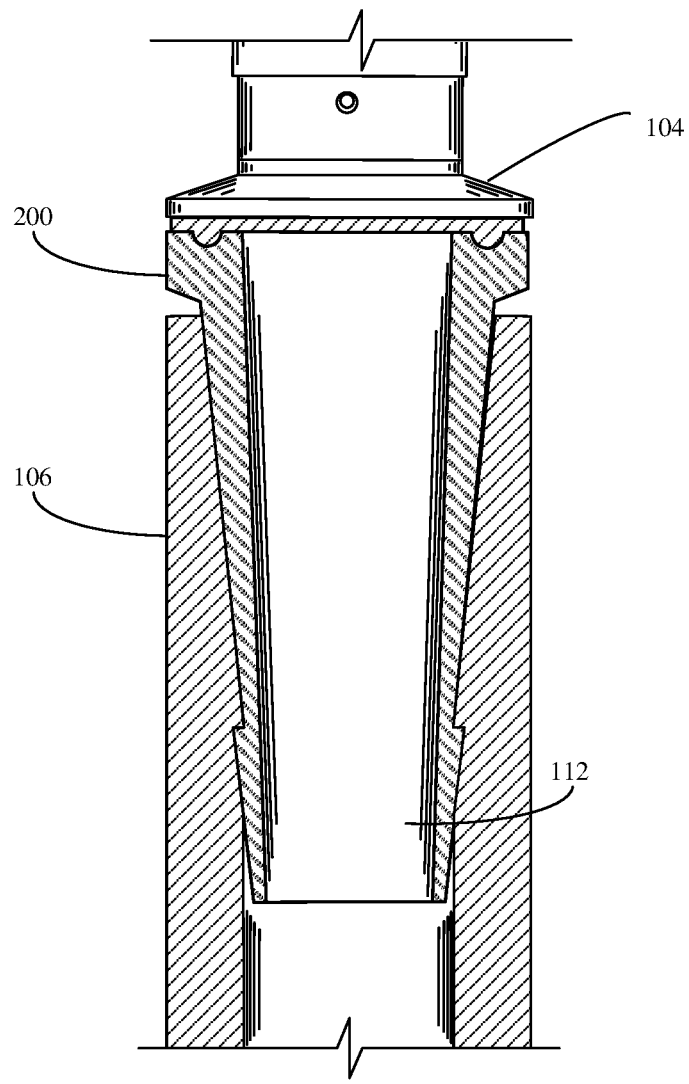
FIG. 1B is a diagrammatic view illustrating a hose of a single-use container being coupled to a portion of a measurement instrument.

FIG. 1B is a diagrammatic view illustrating tubing of a single-use container being coupled to measurement instrument 104, a portion of which is shown in FIG. 1B. Tubing 106 is coupled to sensor connector 200, which seals and isolates biological sample 112 within sensor connector 200 from measuring instrument 104, while still allowing measuring instrument 104 to sense or otherwise transduce useful information about the biological sample 112.

Measuring instrument 104 can measure a parameter of biological sample 112 which can include temperature, pressure, dissolved oxygen, pH, et cetera. Additionally, measuring instrument 104 can perform additional signal processing such as utilizing characterization and/or calibration information to compensate for variations in temperature and/or other environmental variables. Measuring instrument 104 conveys the measurements and other useful data to applicable process monitoring and/or controlling equipment.

Figure 2A:
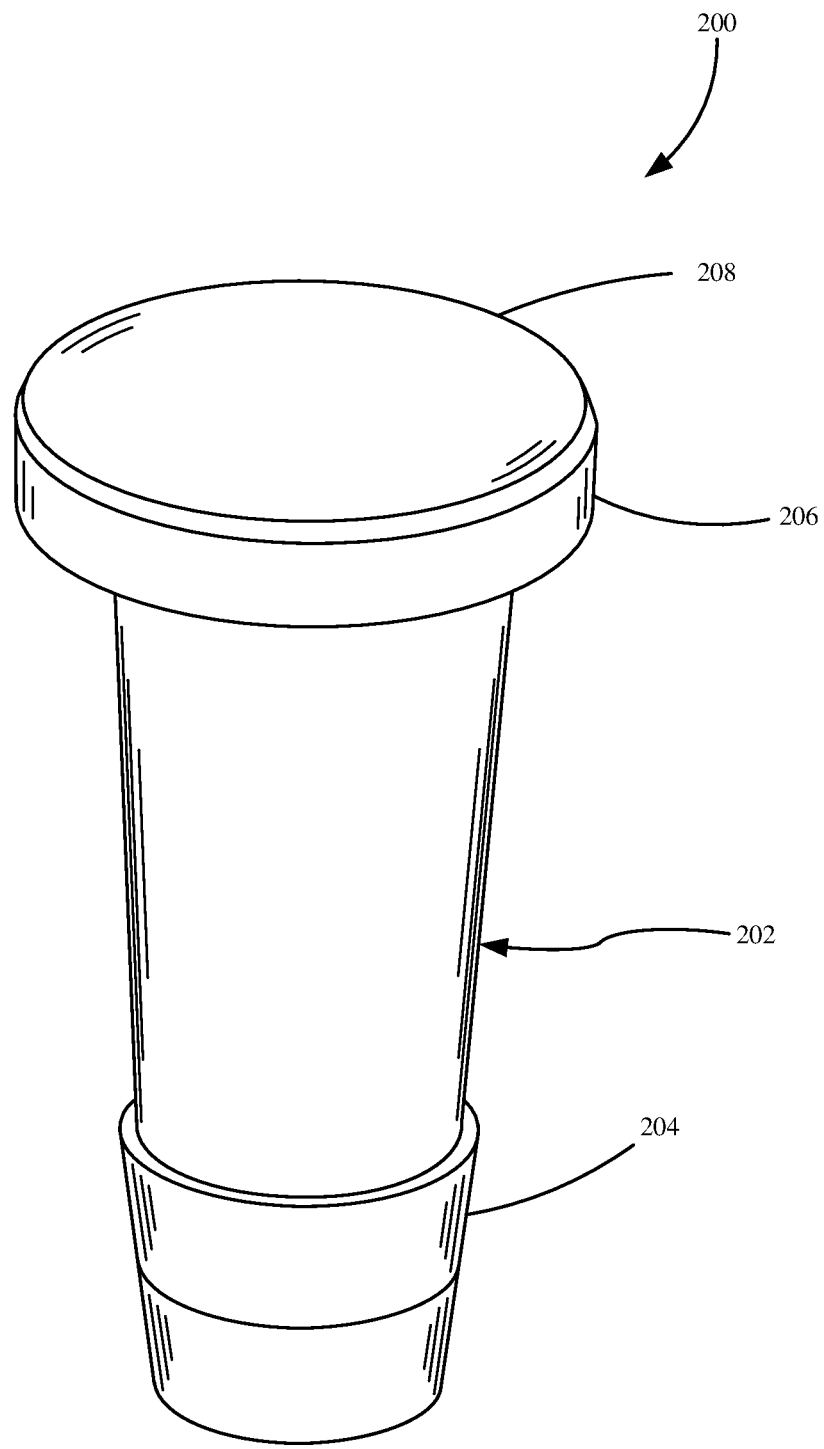
FIG. 2A is a diagrammatic view of a connector with a connector region and diaphragm in accordance with an embodiment of the present invention.

FIG. 2A is a diagrammatic view of a sensor connector with a connector region and diaphragm in accordance with an embodiment of the present invention. Sensor connector 200 illustratively includes a connector region 202 having a flange 206 sealed (i.e., liquid and gas tight arrangement) to diaphragm 208, which is configured to contact a sample. Connector region 202 includes a barb 204 or other connection method configured to receive and retain a tube or other fluidic coupling mechanism connected to a bioreaction bag. While embodiments will generally be described that employ a hose barb, other connection geometries (both standard and non-standard) can be practiced in accordance with embodiments of the present invention.

In operation, upon coupling barb 204 to a fluidic coupling mechanism attached to a bioreaction bag, connector region 202 receives a sample of media from the bioreaction bag in which the sample bears directly against an interior of deflectable diaphragm 208. In turn, a measurement instrument, such as a pressure sensor, that is operably coupled to an exterior of diaphragm 208 can then measure a parameter, such as pressure, of the sample based on a characteristic change in diaphragm 208.

In this configuration, a measurement instrument is able to measure a parameter of the media, such as pressure, without directly contacting the media itself. As a result, a relatively high precision measurement instrument can obtain a high-quality media measurement and provide an indication thereof to monitor and/or control equipment without contacting the media directly. In this fashion, a measurement instrument can be reused after being coupled to connector 200, enabling the measuring instrument to be a relatively complex and feature-rich device that is able to carry out a number of functions. Additionally, connector 200 can be designed as a single-use piece that can be thrown away, along with the single-use container, after a biological reaction occurs within the single-use container.

Deflectable diaphragm 208 can be formed of any material that is suited for exposure to the media and is able to allow a measurement instrument disposed on an opposite side thereof to transduce meaningful information relative to the media. This may include one uniform material or a plurality of different materials. For example, an interior of diaphragm 208 may be formed of a different material compared to an exterior of diaphragm 208. Example materials can include silicone rubber, polytetrafluoroethylene (PTFE), various durometer urethanes, nylon, polyethylene terephthalate (PET), and Pebax®. Deflectable diaphragm 208 and connector region 202 can also be a single unitary piece.

Additionally, diaphragm 208 may be treated during a manufacturing process to optimize strength, durability, compatibility, or other characteristics. For example, diaphragm 208 may be reinforced by fiber during the manufacturing process. Further, it is contemplated that the flexible material of diaphragm 208 does not react with the media, such that, chemically, diaphragm 208 remains the same upon contacting the media sample.

In one example, connector region 202 can be made of plastic, metal, or other materials that allow connector 200 to directly contact the media. Connector 200 could also be made of more than one material to optimize the mechanical, chemical or other characteristics for any particular media application. Also, inner surface 210 of connector 200 could have a coating applied thereto in order to be better suited for any particular media application.

Figure 2B:
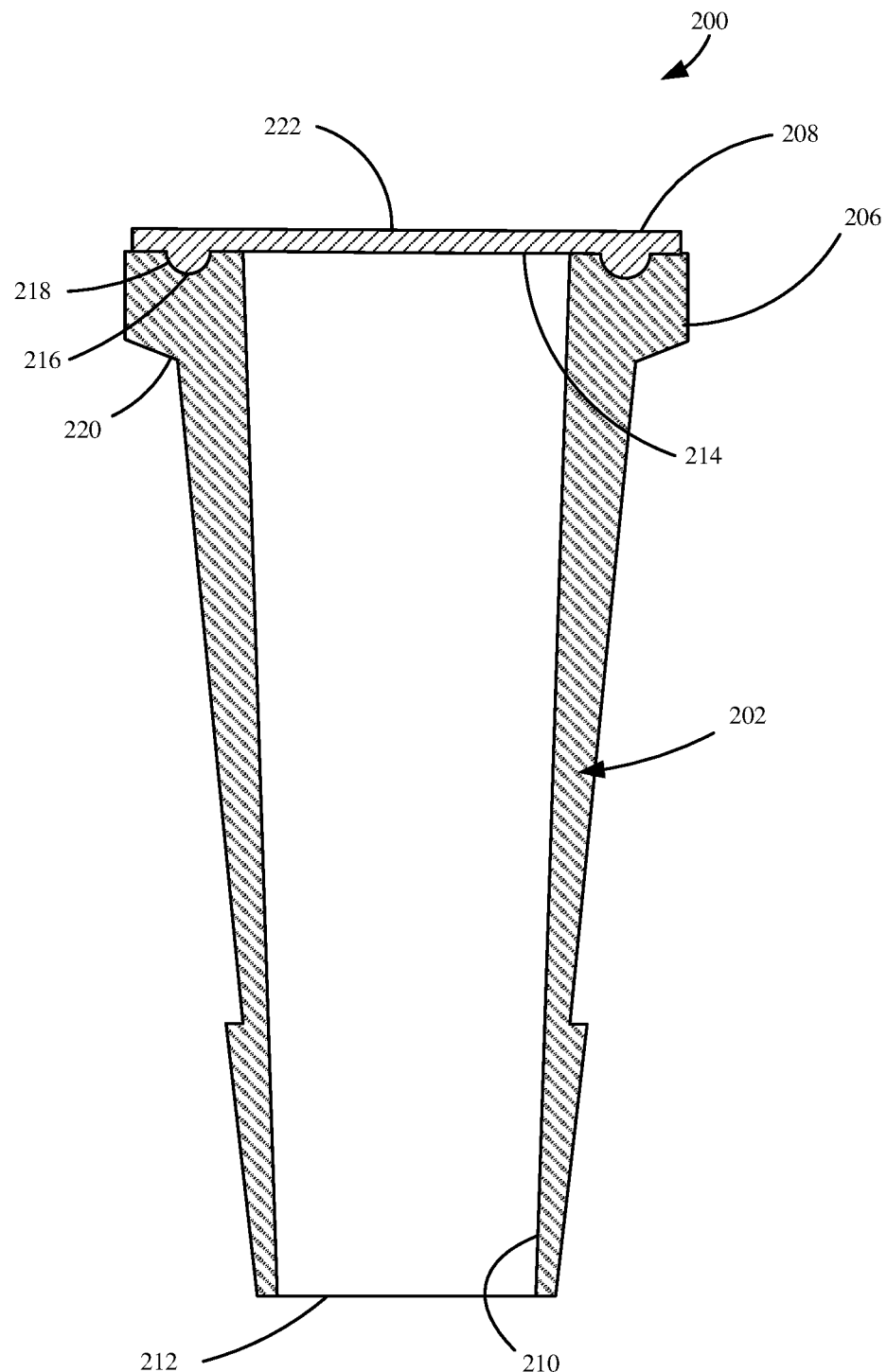
FIG. 2B is a cross sectional view of a connector with a connector region and diaphragm in accordance with an embodiment of the present invention.

FIG. 2B is a cross sectional view of a connector with a cylindrical connector region and diaphragm in accordance with an embodiment of the present invention. As illustratively shown, connector 200 includes diaphragm 208 sealed to flange 206 of connector region 202. Connector region 202 includes a passageway 210 extending from first end 212 of connector 200 to an interior surface 214 of diaphragm 208. Passageway 210 can receive a media sample from a fluidic coupling mechanism, e.g. a hose, tube, bag, et cetera attached to a bioreaction bag, such that the media sample contacts the interior surface 214 of diaphragm 208. Subsequently, a sensor coupled to an exterior surface 222 of diaphragm 208 can detect a change in a characteristic of diaphragm 208 such as pressure or temperature, resulting from the media contacting interior surface 214.

As shown in FIG. 2B, flange 206 may include a surface configuration or groove 216 that is configured to receive an annular ring 218 of diaphragm 208 in order to correctly position or promote the coupling of the surfaces of diaphragm 208 relative to flange 206. Additionally, this increases the surface area between flange 206 and diaphragm 208. In one example, coupling diaphragm 208 to flange 206 involves overmolding diaphragm 208 onto flange 206 to allow a single, permanent fitting to be produced between diaphragm 208 and flange 206. However, it is contemplated that diaphragm 208 may also be coupled to flange 206 using an adhesive or weld. In the illustrated example, diaphragm 208 is overmolded onto flange 206, and it is contemplated that diaphragm 208 may not fully encapsulate flange 206. For example, diaphragm 208 may just be overmolded to aperture 210 of connector region 202. Alternatively, diaphragm 208 may extend entirely along flange 206 or up to and beyond a tapered portion 220 of flange 206.

Figure 3:
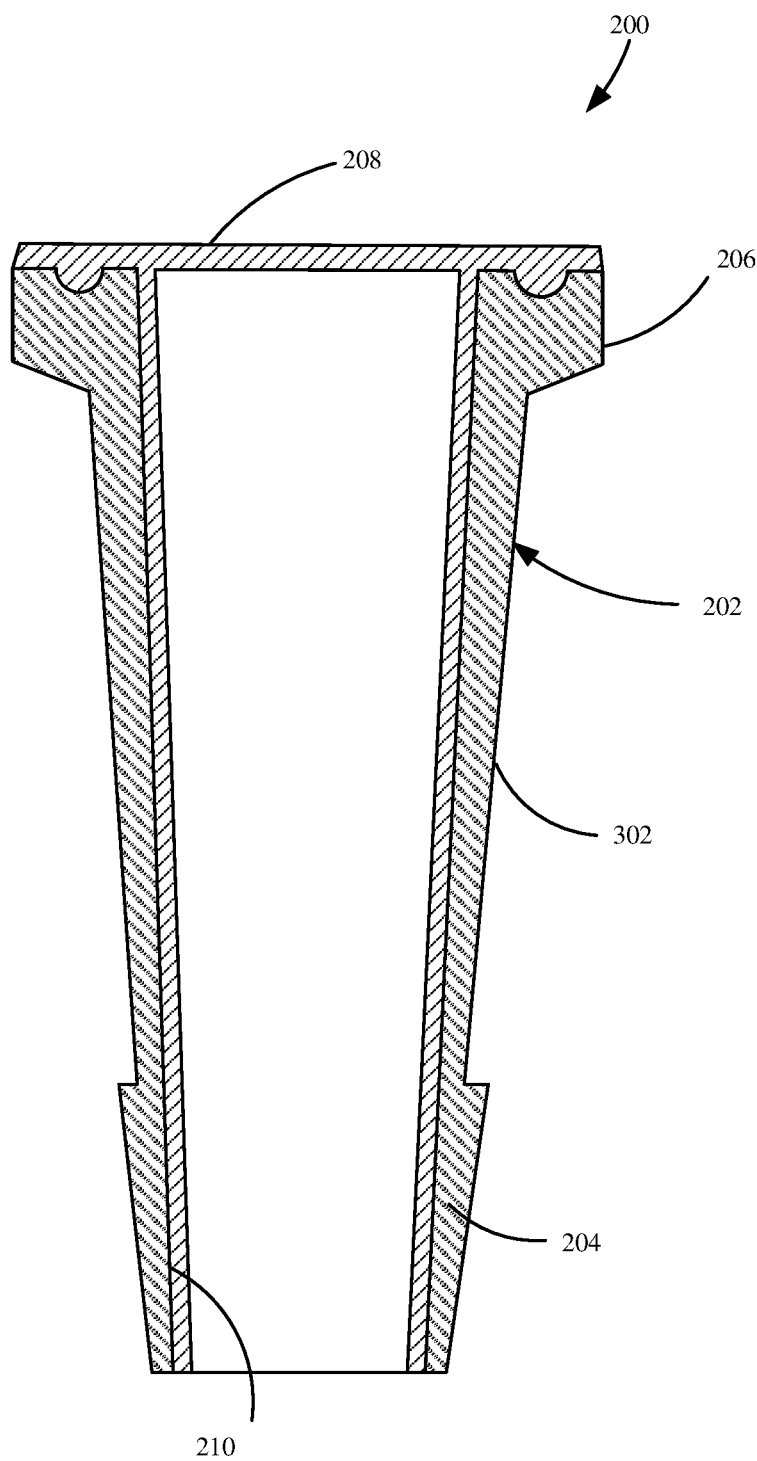
FIG. 3 is a cross sectional view of a connector with a connector region and diaphragm in accordance with another embodiment of the present invention.

FIG. 3 is a cross sectional view of a connector with a connector region and diaphragm in accordance with an embodiment of the present invention. As illustratively shown, diaphragm 208 extends along flange 206 and includes an extended portion extending along the inner wall of connector region 202. In this embodiment, diaphragm 208 can be considered as a singular piece with connector region 202. While the extended portion of diaphragm 208 illustratively lines passageway 210 in its entirety, it is also contemplated that diaphragm 208 may only line a portion of passageway 210, or, alternatively, may extend out of passageway 210 and back around barb 302, as shown in greater detail with respect to FIGS. 4A and 4B.

In this embodiment, upon receiving a media sample from a bioreaction bag, a pressure within passageway 210 does not urge diaphragm 208 to decouple from connector region 202 as diaphragm 208 and its extended portion extends along passageway 210. Additionally, diaphragm 208 and connector region 202 can be manufactured as two separate pieces that are combined just prior to coupling connector 200 to a fluidic coupling mechanism, such as a bag, tube, hose, et cetera. However, once diaphragm 208 is coupled to connector region 202, they form a single permanent connector 200 that can be permanently fixed to the fluidic coupling mechanism. A clamp may then be added to securely hold connector 200 to a measuring instrument.

In operation, once connector 200, in accordance with any of the embodiments presented herein, is coupled to a fluidic coupling mechanism of a bioreaction bag, the entire system is considered to be sealed and can be sterilized. In one example, connector 200 can be coupled to the fluidic coupling mechanism just prior to a sterilization of the single-use container and/or fluidic coupling mechanism such that connector 200 undergoes the same sterilization procedure. Sterilization, in one example, can include utilizing gamma radiation. Upon being sterilized, the system is configured to remain a sealed unit, maintaining a sterile internal state.

Additionally, it is noted that during the sterilization process of the single-use container and connector 200 no electronics or sophisticated devices are coupled to the system. As such, high quality sensors can be attached, removed and reattached to diaphragm 208 so that the sensor does not have to be sterilized. Additionally, a risk of damage to electronic devices is mitigated.

Figure 4A:
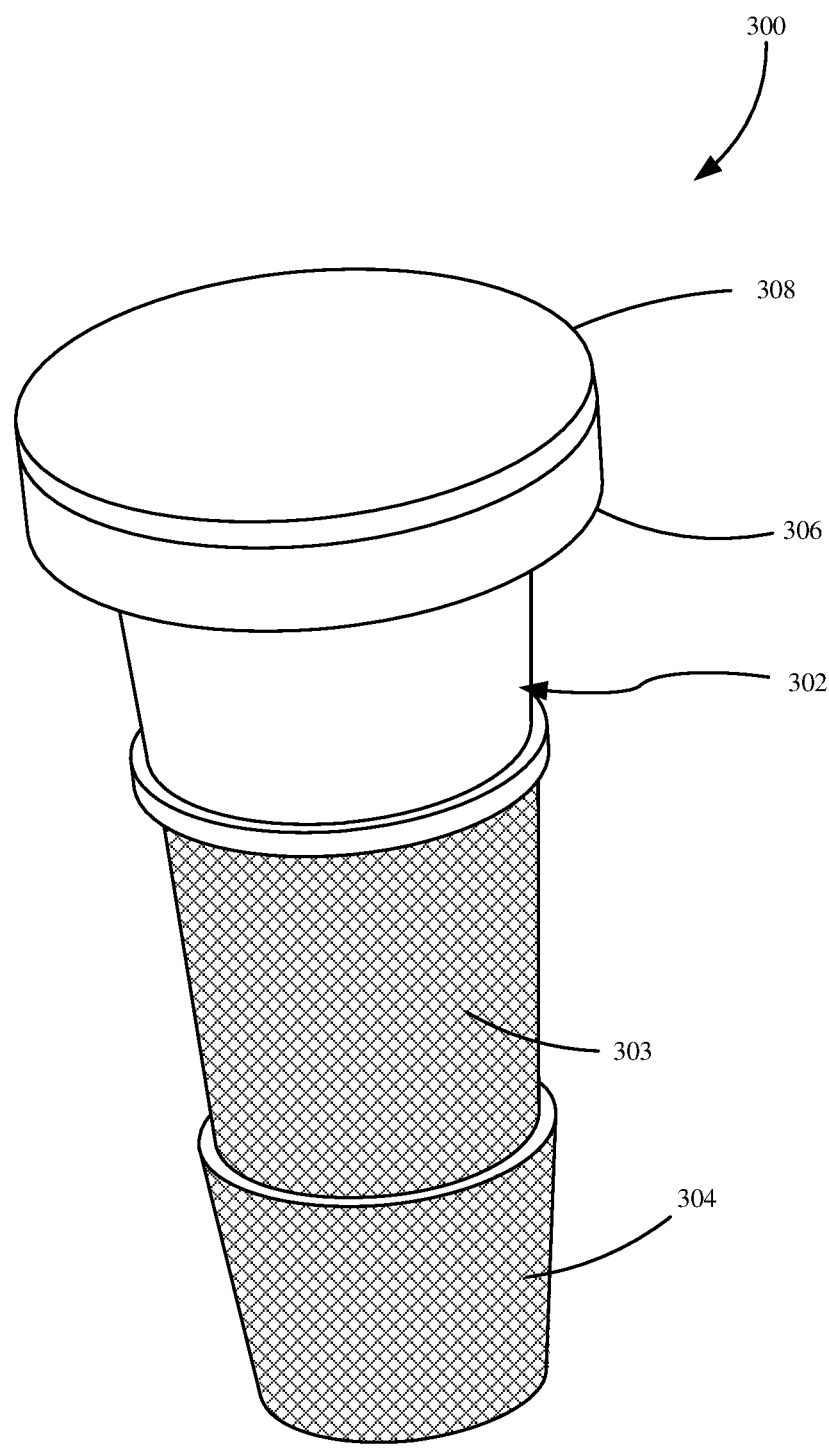
FIG. 4A is a diagrammatic view of a connector with a connector region and diaphragm in accordance with another embodiment of the present invention.

FIG. 4A is a diagrammatic view of a connector with a connector region and diaphragm in accordance with another embodiment of the present invention. The embodiment shown in FIGS. 4A and 4B bears some similarities to the embodiments described with respect to FIGS. 2A, 2B, and 3, and like components are numbered similarly. As illustratively shown, connector 300 includes diaphragm 308 and connector region 302, as well as a flexible material 303 encasing barb 304 and portions of connector region 302. Flexible material 303 may be the same as or different than the material from which deflectable diaphragm 308 is constructed. Diaphragm 308 may also be formed of the same material or different material than connector region 302. Additionally, flexible material 303 may line an aperture 310 within connector 300, as will be discussed with respect to FIG. 4B. However, flexible material 303 may extend from an interior of diaphragm 308, along inner passageway 310 of connector 300, to an exterior of connector region 302, which can include barb 304 and other portions of connector region 302.

Figure 4B:
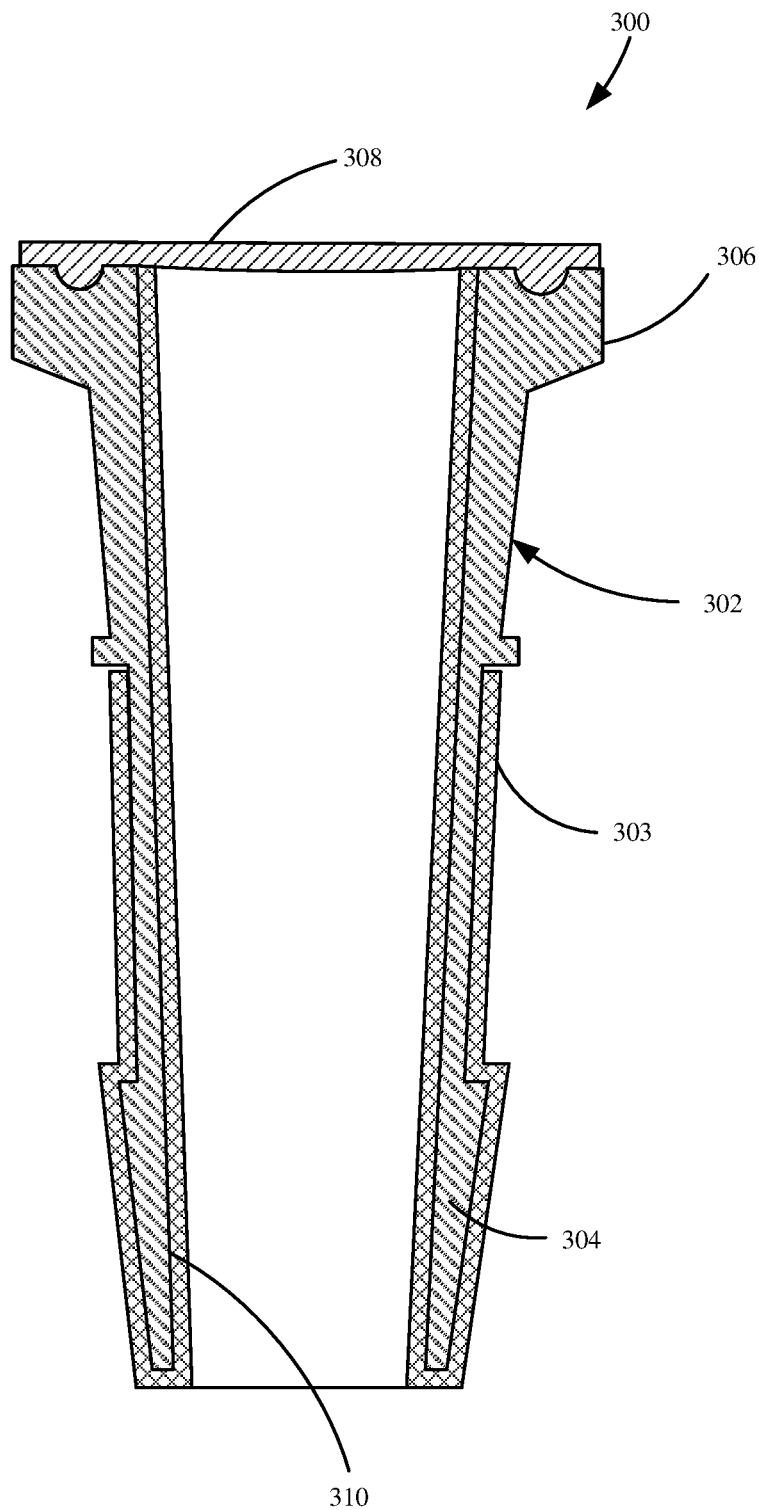
FIG. 4B is a cross sectional view of a connector with a connector region and diaphragm in accordance with an embodiment of the present invention.

FIG. 4B is a cross sectional view of a connector with a connector region and deflectable diaphragm in accordance with an embodiment of the present invention. As illustratively shown, form-fit flexible material 303 lines aperture 310 and encapsulates barb 304 and portions of connector region 302. In this embodiment, flexible material 303 can be considered a "glove" that can be pulled or otherwise deformed to encapsulate connector region 302. Flexible material 303 can fully encapsulate connector region 302, or, as illustratively shown, designated portions of connector region 302. In an embodiment where material 303 is different than the material of connector region 302, a preformed insert of material 303 having a deflectable diaphragm coupled thereto, may be passed through aperture 310 and then folded back over hose barb 304. In another example, instead of folding back the flexible material over hose barb 304, the flexible material could be coupled to another fitting and potentially over a hose barb of that fitting.

Figure 5:
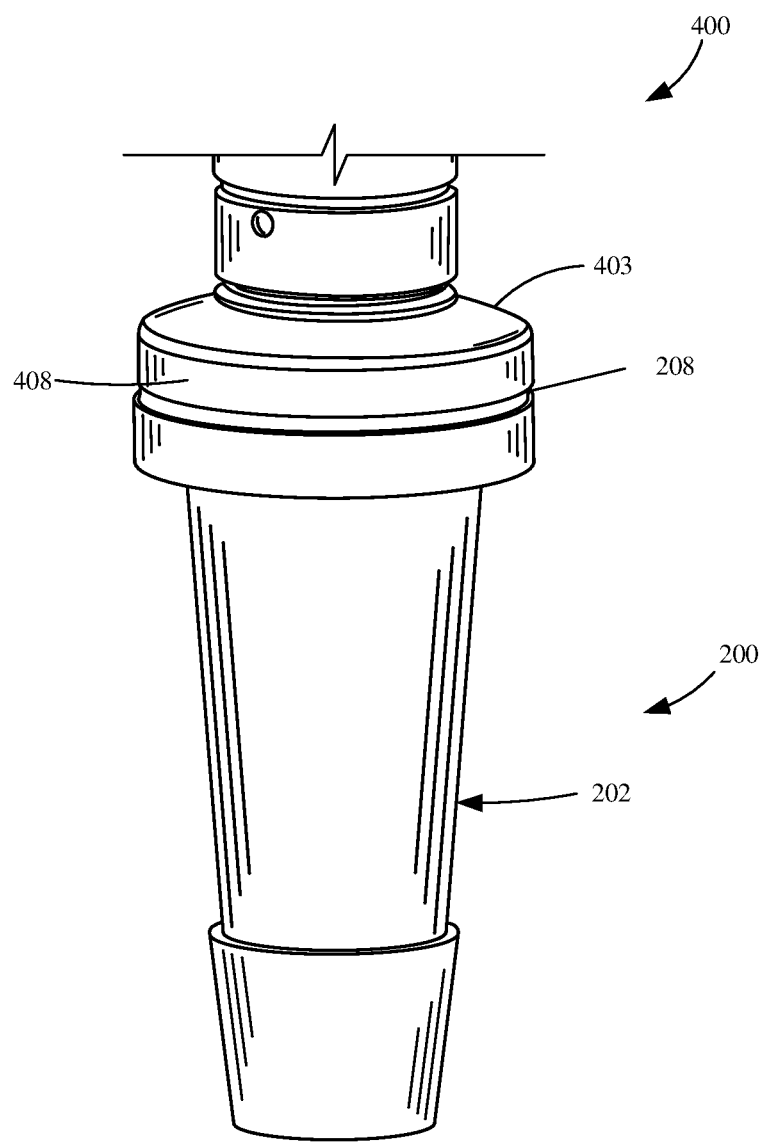
FIG. 5 is a diagrammatic view of a connector coupled to a process measurement sensor in accordance with an embodiment of the present invention.

FIG. 5 is a diagrammatic view of a sensor connector coupled to a measurement instrument in accordance with an embodiment of the present invention. While measurement instrument 400 is illustratively shown as a pressure sensor, it is expressly contemplated that other types of sensors can be used as well. In operation, measurement instrument 400 is coupled to diaphragm 208 of connector 200 via a clamping mechanism or other suitable structure that attaches measurement instrument 400 by contacting tapered portion 220 and the tapered portion 403 of measurement instrument 400. However, other connection mechanisms can be used as well. Connector 200 includes connector region 202, coupled to diaphragm 208, configured to receive a media sample from a fluidic coupling mechanism. Furthermore, as illustratively shown, a diaphragm-coupling portion 408 of measurement instrument 400 is configured to couple to diaphragm 208.

In operation, as a pressure within connector region 202 changes, resulting from a received media sample from a fluidic coupling mechanism, diaphragm 208 will exert a pressure on the sensing element of the pressure sensor. In turn, the electrical output of the sensor will correspond to the pressure within connector 200. Additionally, in this embodiment, measurement instrument 400 will not be exposed directly to the media sample itself, but merely the pressure thereof.

In this embodiment, once a biological reaction is complete within a single-use container, pressure sensor 400 may be decoupled from connector 200 and reused in a later reaction. This may include coupling pressure sensor 400 to an additional connector 200 coupled to a different single-use container.

Although the present invention has been described with reference to preferred embodiments, workers skilled in the art will recognize that changes may be made in form and detail without departing from the spirit and scope of the invention.

What is claimed is:

1. A sensor connector for coupling a single-use container to a measurement instrument, the connector comprising:
   a connector region having a substantially cylindrical sidewall, the substantially cylindrical sidewall having at least one hose barb disposed on an outer surface, the at least one hose barb being configured to receive and to retain tubing attached to a single-use container; and
   a deflectable diaphragm sealed to the connector region and configured to contact a measurement instrument and a media sample, the deflectable diaphragm having a portion that lines an interior surface of at least a portion of the substantially cylindrical sidewall.

2. The sensor connector of claim 1, wherein the measurement instrument comprises a pressure sensor configured to measure pressure of the media sample based on deflection of the deflectable diaphragm.

3. The sensor connector of claim 1, wherein the deflectable diaphragm comprises a material selected from the group consisting of silicone rubber, polytetrafluoroethylene, durometer urethane, nylon and polyethylene terephthalate.

4. The sensor connector of claim 1, wherein the measuring instrument is configured to couple to the connector via a clamping mechanism.

5. The sensor connector of claim 1, wherein the connector region is formed of a material selected from the group consisting of stainless steel, plastic, polyethylene, polypropylene, and polyvinylidene fluoride.

6. The sensor connector of claim 1, wherein the connector region comprises a flange with a surface geometry configured to receive the deflectable diaphragm to align the delectable diaphragm with the connector region.

7. The sensor connector of claim 6, wherein the deflectable diaphragm is overmolded onto the connector region such that the deflectable diaphragm and the connector region form a single permanent fitting.

8. The sensor connector of claim 7, wherein the deflectable diaphragm is overmolded along the flange of the connector region.

9. The sensor connector of claim 1, and further comprising a flexible material coupled to the deflectable diaphragm and lining an internal aperture of the connector region.

10. The sensor connector of claim 9, wherein the flexible material extends over a hose barb on an external surface of the connector region.

11. A single-use sensing assembly, comprising:
a single-use container;
a sensor configured to monitor a parameter of interest; and
a connector configured to simultaneously couple the sensor to the single-use container while sealing the single-use container, the connector including a deflectable diaphragm disposed between the sensor and the single-use container.

12. The single-use sensing assembly of claim 11, wherein the sensor is a pressure sensor.

13. The single-use sensing assembly of claim 11, wherein the connector comprises a connector region configured to receive a sample from the single-use container.

14. The single-use sensing assembly of claim 13, wherein the connector region comprises a barb configured to receive and retain tubing attached to the single-use container.

15. A single-use container assembly, comprising:
a single-use container;
tubing attached to the single-use container; and
a connector coupled to the tubing, the connector including a connector region coupled to the tubing and a deflectable diaphragm overmolded to the connector region.

16. The single-use container assembly of claim 15, wherein the connector region comprises a barb.

17. The single-use container assembly of claim 16, wherein the deflectable diaphragm is configured to simultaneously contact a media sample and a sensor configured to monitor a property of the sample.

18. The single-use container assembly of claim 17, wherein the deflectable diaphragm comprises a singular, flexible material.

19. The single-use container assembly of claim 15, wherein the deflectable diaphragm includes an annular ring configured to be received by the connector to align the deflectable diaphragm relative to the connector.

* * * * *